Figure 1:
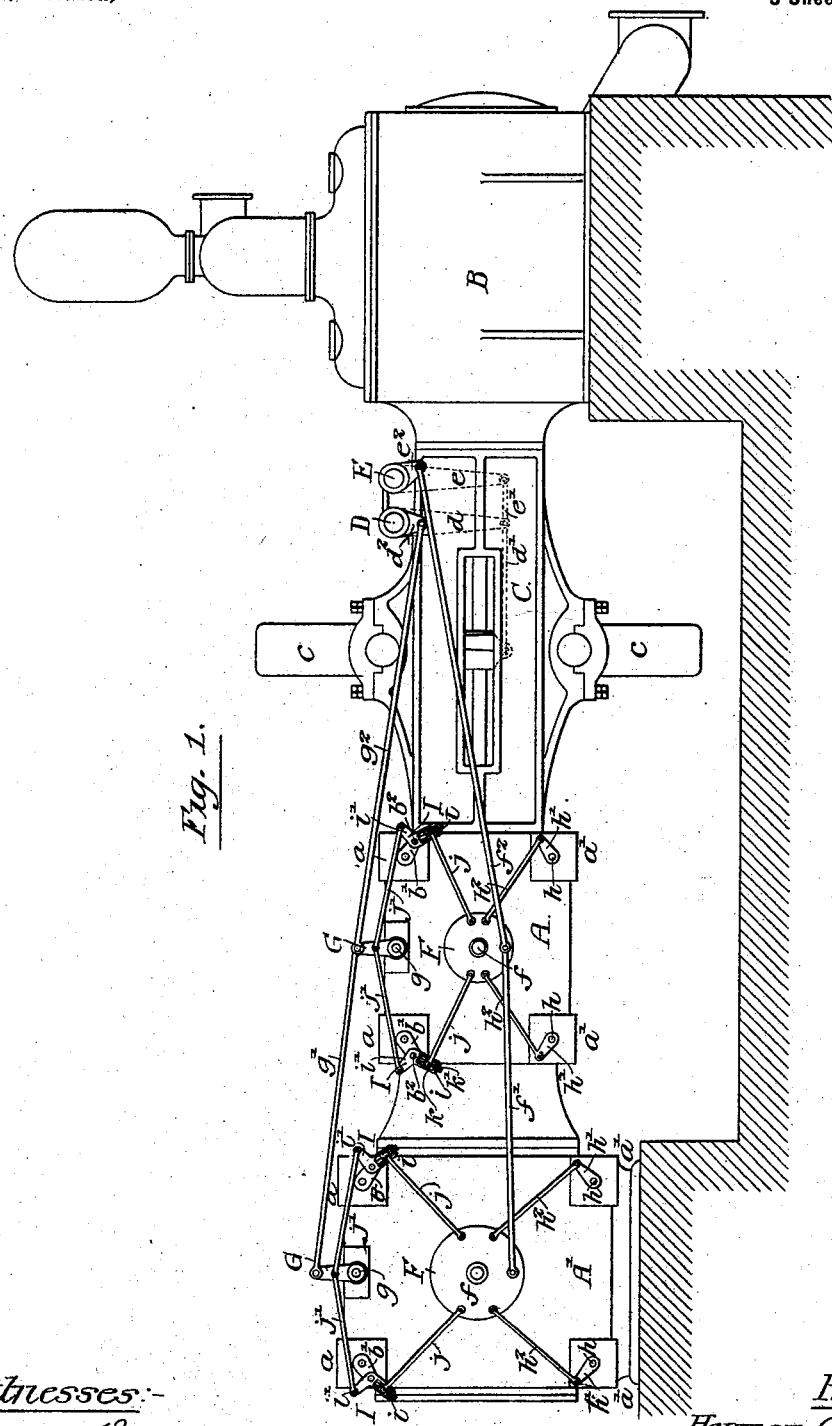

No. 692,669. Patented Feb. 4, 1902.
H. A. JENSENIUS.
VALVE MECHANISM FOR DUPLEX ENGINES.
(Application filed Mar. 30, 1901.)
(No Model.) 3 Sheets—Sheet 1.

Witnesses:—
Herman E. Metius.
Louis W. F. Whitehead

Inventor:—
Herman A. Jensenius.
by his Attorneys:—

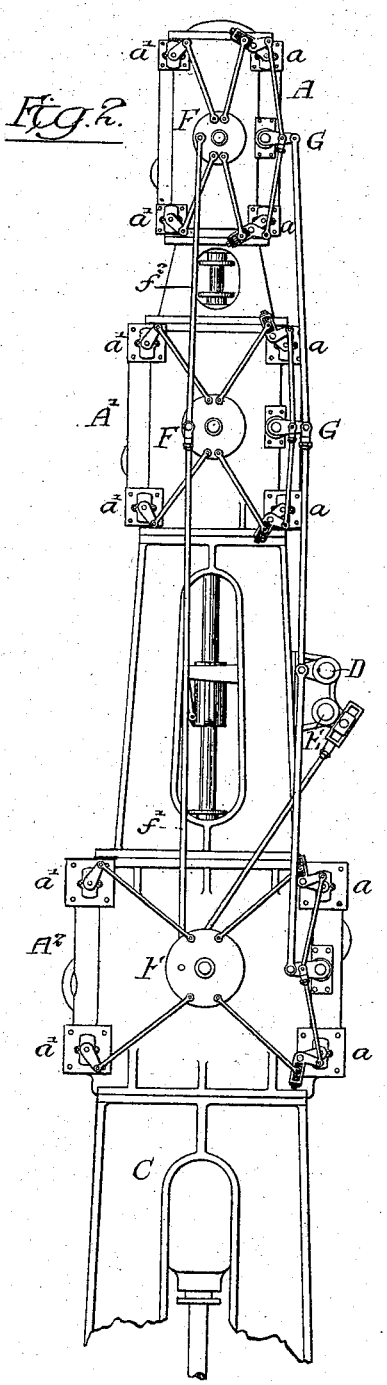

No. 692,669. Patented Feb. 4, 1902.
H. A. JENSENIUS.
VALVE MECHANISM FOR DUPLEX ENGINES.
(Application filed Mar. 30, 1901.)
(No Model.) 3 Sheets—Sheet 3.
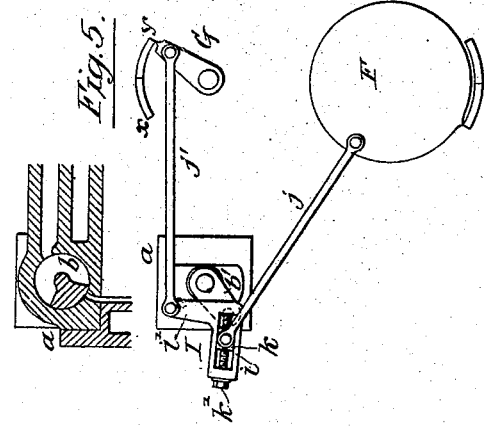
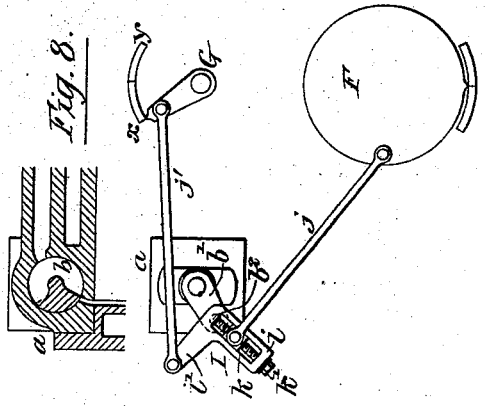
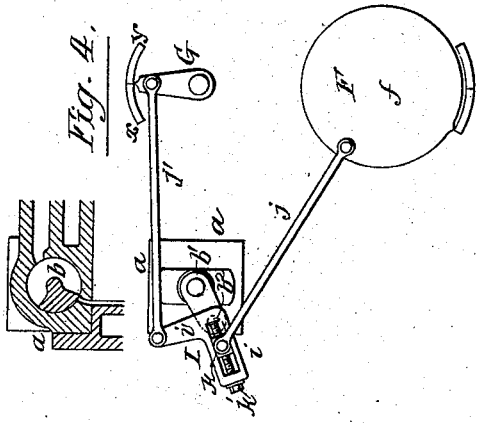
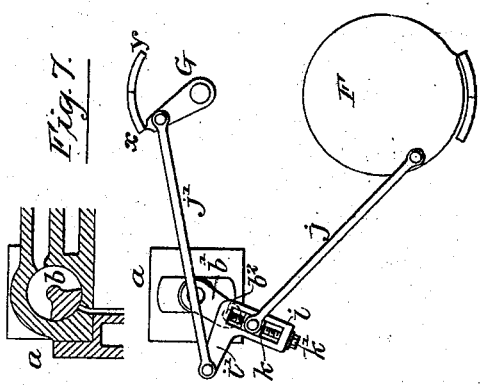
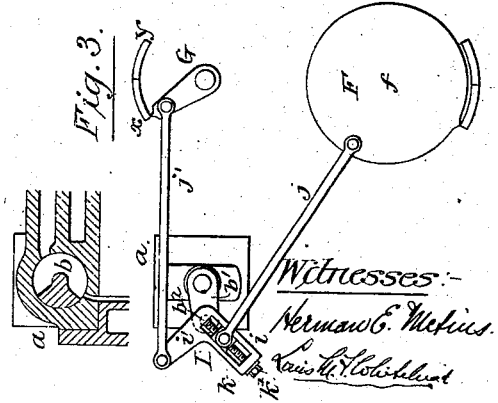
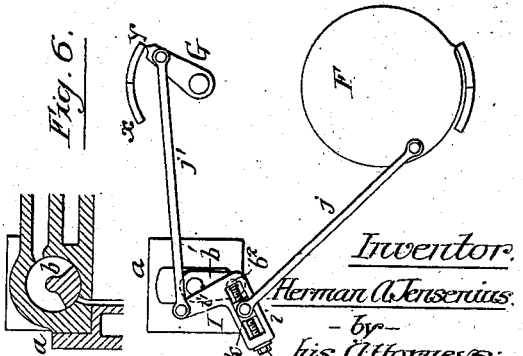
Witnesses:—
Inventor.
Herman A. Jensenius.
by
his Attorneys:—

UNITED STATES PATENT OFFICE.

HERMAN A. JENSENIUS, OF CAMDEN, NEW JERSEY, ASSIGNOR TO CAMDEN IRON WORKS, OF CAMDEN, NEW JERSEY, A CORPORATION OF NEW JERSEY.

VALVE MECHANISM FOR DUPLEX ENGINES.

SPECIFICATION forming part of Letters Patent No. 692,669, dated February 4, 1902.

Application filed March 30, 1901. Serial No. 53,606. (No model.)

*To all whom it may concern:*

Be it known that I, HERMAN A. JENSENIUS, a citizen of the United States, and a resident of Camden, New Jersey, have invented certain Improvements in Valve Mechanism for Duplex Engines, of which the following is a specification.

My invention relates to certain improvements in valve mechanism for duplex engines of the expansion type, in which a single valve controls both the admission and cut off of the motive fluid and in which separate exhaust-valves are used.

The object of my invention is to improve the construction of this type of engine, so that the opening of the steam-inlet valves of one engine for the admission of steam is controlled by the engine on the opposite side and the closing of the valves for the cut-off by its own engine, the opening and closing of the exhaust-valves being controlled by the opposite engine.

It will be understood that my invention is especially applicable to multiple-cylinder duplex direct-acting steam pumping-engines; but my invention may be applied to other engines of the duplex type where steam under expansion is used without departing from my invention.

In the accompanying drawings, Figure 1 is a side view of a horizontal duplex triple-expansion pumping-engine, illustrating my invention. Fig. 2 is a view of the steam end of a vertical triple-expansion duplex pumping-engine, and Figs. 3, 4, 5, 6, 7, and 8 are diagram views showing the valve mechanism and the valve in different positions of the stroke.

The engines of a duplex pumping-engine are made in duplicate, and therefore I will simply describe one engine in detail.

A is the high-pressure cylinder. A' is the intermediate cylinder, and $A^2$ is the low-pressure cylinder. In the present instance these cylinders are arranged in tandem, with the high-pressure cylinder in front.

B is the pump-cylinder, made in the usual manner and connected to the cylinder-casting of the high-pressure cylinder by a frame C, on which are pivoted the equalizing-cylinders $c\ c$, which are connected to the piston-rod extending from the steam end of the engines to the water end. This mechanism is duplicated on the opposite side of the engine, so that the engine is of the duplex type, and each half of the engine is triple-expanding. Each cylinder has steam-inlet-valve chests $a\ a$ and exhaust-valve chests $a'\ a'$, situated at the corners of each cylinder-casting, as shown in the drawings. In the steam-valve chests $a\ a$ are the valves $b\ b$, and in the exhaust-valve chests are suitable valves of any of the ordinary constructions.

D and E are two transverse rock-shafts mounted in bearings in the frame C and extending from one engine to the other. The rock-shaft D has an arm $d$, connected to the piston-rod of the front engine by a link $d'$, and the rock-shaft E has an arm $e$, connected by a link $e'$ to the piston-rod of the rear engine.

On each cylinder-casting is a disk F, pivoted at $f$, and these disks are connected together by rods $f'$, and the disk of the high-pressure cylinder is connected to an arm $e^2$ on the rock-shaft E by a rod $f^2$, so that motion is imparted to the disks F by the rear engine through the rock-shaft E.

On each cylinder-casting is a lever G, pivoted at $g$, and the several levers are connected together by rods $g'$, and the lever G on the high-pressure-cylinder casting is connected to an arm $d^2$ on the rock-shaft D by a rod $g^2$, so that motion is imparted to the lever G from the piston-rod of its own (front) engine through the rock-shaft D. The disks F and the levers G of the rear or opposite engine are connected in the same manner, with the exception that the levers G of that engine are connected to an arm on the rock-shaft E, while the disks F are connected to an arm on the rock-shaft D. The movement of each of the disks F opens the valves for the admission of steam, while the movement of each of the levers G closes the valves for cut-off. Therefore the movement of the disks F is controlled by the opposite mechanism and the movement of the levers G is controlled by its own mechanism.

The stems $h\ h$ of the exhaust-valves have arms $h'$, which are connected to the disk F by links $h^2$. These valves are not connected to the levers G. Therefore they are simply opened and closed in the ordinary manner common to this type of engine.

On the arm $b'$ of each valve $b$ is pivoted at $b^2$ a floating lever I. One arm $i$ of this lever is connected by a link $j$ to the disk F, while the other arm $i'$ is connected to the lever G by a link $j'$. In the arm $i$ is a block $k$, to which the link $j$ is attached, and this block can be adjusted toward the fulcrum $b^2$ by means of a set-screw $k'$ to regulate the closing of the valve, and therefore the amount of cut-off. It will be noticed on referring to the diagrams that the valve is shown to cut off at one-half stroke, but the adjustment is made to cut off from one-fourth to the end of the stroke, and I will describe my invention with the valve shown as cutting off at one-half the stroke. When the adjustable block $k$ is moved to its extreme outer position, the valve will cut off at one-quarter stroke, and when it is moved so that it will be near the fulcrum $b^2$ of the lever there will be no cut-off movement imparted to the valve. In the drawings I have not shown the block so arranged and the link pivoted to the block so that the pivot of the link will come directly over the fulcrum, as I find, in working out the movement, that when the block is adjusted up to near the fulcrum-point, the valve will not be affected by any slight movement imparted through the medium of the levers G, so that there is no cut-off when the block is in this position. The lever may be so formed, however, that the block can be moved directly in line with the fulcrum. This means of adjustment is one of the important features of the invention, as it is not necessary to dismantle the engine to operate when cut off, and by simply adjusting the block in the arm $i$ of the lever I any amount of cut-off desired can be given to the valve.

Referring now to the diagrams, Figs. 3 to 8, inclusive, I have shown the valve in section directly above the valve mechanism in each diagram. In the diagram Fig. 3 both pistons are at the end $x$ of their respective cylinders, and the piston of the front engine is starting toward B, while the piston of the rear engine remains at $x$, and the valve of the front engine is full open to take steam. In Fig. 4 the piston of the front engine is at half-stroke going toward $y$, while the piston of the rear engine remains at $x$, and the valve is shown as cutting off the steam at half-stroke. In Fig. 5 the piston of the front engine is at $y$, the extreme end of its stroke, while the piston of the rear engine is about starting from $x$ toward $y$, and the steam-valve of the front engine is still closed. In Fig. 6 the piston of the front engine is ready to start from $y$ to $x$ on its return stroke, while the piston of the rear engine has completed its stroke and is at $y$. The valve of the rear engine remains closed. In Fig. 7 the piston of the front engine has completed its return stroke from $y$ to $x$ and the piston of the rear engine is ready to start on its return stroke from $y$ to $x$. In Fig. 8 the piston of the front engine remains at $x$, while the piston of the rear engine has traveled one-half its stroke from $y$ toward $x$, and this movement is being imparted to the valve, which is about opening to admit steam to the cylinder of the front engine. When the piston of the rear engine has finished its stroke to $x$, the position of the valve-gear is as shown in Fig. 3, the valve of the front engine being open, taking steam, and the piston of the front engine is starting from $x$ toward $y$.

It will be readily seen by the above-described diagrams that I provide a very simple mechanism for operating and controlling the steam-valve of a duplex pumping-engine, in which the amount of cut-off can be regulated at will by simply adjusting the blocks on their respective floating levers I and without dismantling any portion of the valve mechanism and without interfering in any manner with the opening and closing of the exhaust-valves.

In Fig. 2 I have shown the valve mechanism as applied to a triple-expansion duplex vertical pumping-engine, and the only modification is in the position of the rock-shafts, they being mounted in this instance between the intermediate and the low-pressure cylinders, and it will be understood that the rock-shafts may be placed in any position without departing from the main feature of my invention.

I claim as my invention—

1. The combination in a duplex pumping-engine in which the admission of steam is controlled by the opposite side of the engine and the closing of the valves for cut-off is controlled by its own engine, of a valve-chest at each end of the cylinder, a valve therein, an arm on each valve, a floating lever pivoted to each arm, a lever connected to one arm of each floating lever, one of said arms of the floating lever being provided with adjustable mechanism whereby the cut-off of the engine may be varied and a disk connected to the other arm of each floating lever, the said disk being connected to the mechanism controlled by the opposite engine and the lever being connected to the mechanism controlled by its own engine, substantially as described.

2. The combination in a duplex pumping-engine in which the admission of steam is controlled by the opposite side of the engine and the closing of the valves for cut-off is controlled by its own engine, a steam-inlet valve-chest, a valve therein, an arm on the valve, a floating lever pivoted to the arm, one arm of the said lever being connected to the mechanism of its own engine, an adjustable pivot on the other arm, a rod connected to said pivot and to the mechanism operated by the opposite engine so that the amount of cut-off can be regulated by adjusting the pivot toward and from the point where the floating lever is pivoted to the arm of the valve, substantially as described.

3. The combination in a duplex pumping-engine, of a cylinder, a steam-inlet valve and an exhaust-valve at each end of the cylinder, mechanism connected to the opposite engine, and mechanism connected to its own engine, arms on both the inlet and exhaust valves, floating levers carried by the arms on the inlet-valves, one arm of each floating lever having adjustable mechanism whereby the cut-off may be varied, said adjustable mechanism on each floating lever and the arm of each exhaust-valve being connected with mechanism controlled by the opposite engine, the other arm of each floating lever being connected to the mechanism controlled by its own engine, substantially as described.

4. The combination in a duplex pumping-engine, of a cylinder, valves at each corner of the said cylinder, two of these valves being steam-inlet valves and two of the valves being exhaust-valves, arms on each valve, floating levers pivoted to the arms of the steam-inlet valves, a pivoted disk controlled by the mechanism of the opposite cylinder and connected to the arms of the exhaust-valves and connected to a block on one of the arms of each floating lever, means for adjusting the block to regulate the amount of cut-off, and a pivoted lever connected to the mechanism of its own engine and connected to the other arm of each floating lever, substantially as described.

In testimony whereof I have signed my name to this specification in the presence of two subscribing witnesses.

HERMAN A. JENSENIUS.

Witnesses:
WILL. A. BARR,
JOS. H. KLEIN.